Dec. 3, 1957   G. L. BRIDGER ET AL   2,815,262
SEPARATION PROCESS FOR THORIUM SALTS
Filed June 24, 1952
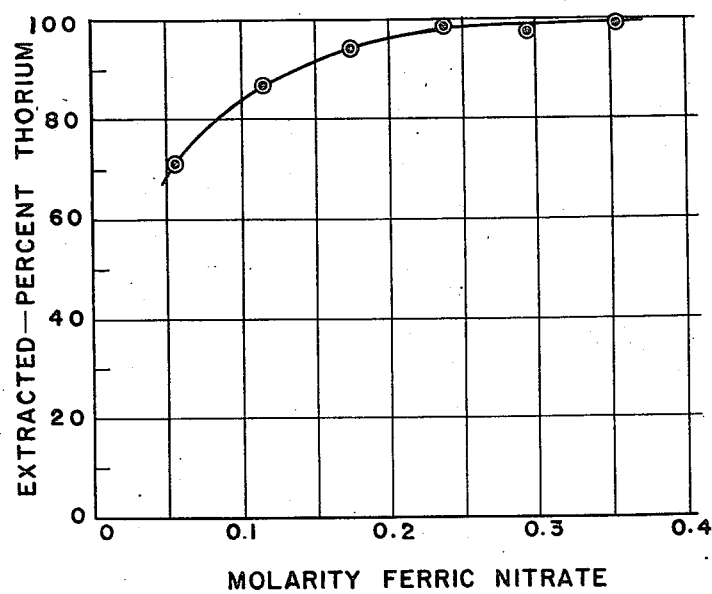
INVENTORS.
GROVER L. BRIDGER
MARVIN E. WHATLEY
KERNAL G. SHAW
BY Roland A. Anderson
ATTORNEY

United States Patent Office 2,815,262
Patented Dec. 3, 1957

2,815,262

SEPARATION PROCESS FOR THORIUM SALTS

Grover L. Bridger, Marvin E. Whatley, and Kernal G. Shaw, Ames, Iowa, assignors to the United States of America as represented by the United States Atomic Energy Commission Application June 24, 1952, Serial No. 295,188

6 Claims. (Cl. 23—14.5)

This invention deals with a process for the separation and recovery of thorium values from ores and in particular with the separation of thorium from monazite sand.

This application is a continuation-in-part of copending application Serial No. 277,362, now abandoned, filed by the inventors on March 19, 1952.

Monazite sand is an ore consisting mainly of phosphates of rare earth elements, thorium and uranium. As a preparatory step for the recovery of the individual compounds of monazite sand, according to one process frequently used, the sand is first digested with concentrated sulfuric acid and the reaction mass obtained thereby is then dissolved in water. The insoluble residue is filtered off, and the sulfuric acid solution is diluted with water.

It is an object of this invention to provide a process for the recovery of thorium and uranium values from phosphate anion-containing solutions.

It is an object of this invention to provide a process for the recovery of thorium values which is extremely simple and economical with regard to initial plant cost as well as to operating cost.

It is also an object of this invention to provide a process for the separation of thorium, uranium and rare earth values from mixtures thereof which has a high degree of efficiency and by which relatively pure compounds are obtained.

It was tried to recover the compounds of the sulfuric acid-monazite solution by selectively extracting some of the values; however, the experiments did not bring about satisfactory results. Experiments carried out on a selective precipitation from sulfuric acid-monazite sand solution were more successful. A fractional neutralization of the sulfuric acid solution while observing critical pH ranges brought about a fractional precipitation of the various components.

It has been found that when the pH of the solution was increased stepwise within the range of about 0.8 to 5.5, a selective precipitation of the thorium, rare earth and uranium values takes place. The total quantities precipitated of each of the ingredients were determined at various pH values; neutralization was carried out with ammonia solution.

The precipitate obtained at a pH value of below about 1.1 consisted practically exclusively of thorium phosphate. At a pH of 1.35 the thorium had been completely precipitated, and the precipitate contained approximately 60% of the rare earth phosphates present (some of it in the form of the ammonium double sulfate). At a pH value between 1.35 and 2.0 only rare earth compounds precipitated; in this range about 30% of the rear earth originally present precipitated. Precipitation of uranium started at a pH of about 2.5, and at the pH of 3.5, when, more than 98% of the rare earth metals had been precipitated, about 30% of the uranium had also been removed from the solution. Precipitation of the uranium values was not complete until a pH value of 5.5 had been reached. These facts have been utilized in the method of this invention for preliminary processing of monazite sand solutions.

Preliminary processing of monazite sand may be carried out in three different modifications, this in particular with regard to the thorium-rare earths separation. Precipitation may be carried out either in two fractions, one containing all of the thorium present and some of the rare earth values and the other fraction containing the remaining rare earth values. In order to accomplish this, adjustment to a pH value of 1.35 has to be made for the first fraction. At a lower pH value not all of the thorium is precipitated, while at a higher value the precipitate contains too much of the rare earth compounds.

According to another embodiment of this invention, a three-fraction precipitation is used for the preliminary separation. In this case, a first fraction containing thorium phosphate only but not all of the thorium present, a second precipitate containing a thorium-rare earths mixture, and a third fraction containing the remainder of the rare earth values are desired. The first step therefore comprises adjustment of the pH to 1.1, while for the second step the pH is increased to 1.35. The third step comprises the increase of the pH to 3.5 when the rare earth compounds and uranium, if present, are precipitated.

A third embodiment comprises pH adjustment to between 1.2 and 1.35 first whereby all of the thorium present and some of the rare earth metal values precipitate, followed by neutralization to a pH value of about 2.3 which mainly causes precipitation of rare earth metal values and then neutralization to a pH of between 5.5 and 6 whereby the remainder of the rare earth metal values and uranium values are precipitated. In this instance the first fraction contained 100% of the total thorium values originally present in the solution, 5% of the rare earth metal values and 0.5% of the uranium values. The second fraction contained 92% of the rare earth metal values and 5.7% of the uranium values, while the third fraction contained the remaining 3% of the rare earth metal values and 93.8% of the uranium values.

Various kinds of alkaline compounds may be used for the adjustment of the pH; sodium carbonate, ammonium hydroxide and sodium hydroxide have been found suitable. A 1 N aqueous solution of sodium carbonate, for instance, and a solution containing about 3% ammonium hydroxide have proved very satisfactory. Ammonium hydroxide yielded the most satisfactory results.

In the three process modifications outlined above, precipitate fractions are obtained which comprise a mixture of thorium phosphate and rare earth phosphates and sulfates, and sometimes also uranium phosphate. These mixed fractions have to be separated further in order to obtain complete recovery of the thorium and/or the rare earth metal values, and possibly also the uranium values of the monazite sand. For the purpose of recovery of the various components of these mixed precipitates, a process has been devised by the inventors which is principally based on selective solvent extraction.

According to a further phase of this invention, a mixed phosphate precipitate, which may have been obtained by a preliminary treatment of monazite sand as described above, or by any other way and from any other source, is dissolved in aqueous nitric acid, and the solution formed is contacted with a water-immiscible alkyl phosphate whereby thorium, and uranium if present, are preferentially taken up by an organic extract phase, while the rare earth metal values preferentially remain in the aqueous solution. It has been found by this invention that by the addition of ferric nitrate the process is considerably improved. The ferric nitrate was found to function in manifold ways. In the first place, it facilitates dissolution of the precipitate. It also improves the extraction because ferric nitrate is a good complexing agent for the phosphate anion. Finally, if present in sufficient quantities, it also acts as a salting-out agent whereby extraction of the thorium and uranium values by the organic solvent is favored. (Under "salting-out agent" an inorganic compound is understood which is highly soluble in water and which, when added in sufficient amounts to an aqueous salt solution to be extracted, promotes the interchange of said salt into an organic solvent therefor.) Finally, it was also found that by the presence of the ferric nitrate the selectivity during extraction is increased. The aqueous raffinate remaining after the extraction contains the phosphate anion, iron, rare earth ions and possibly impurities.

Dissolution of the precipitate with nitric acid and ferric nitrate may be carried out at room temperature; however, heating aids the dissolving step. The concentration of the nitric acid may vary widely, but a concentration of about 20% was preferable. A quantity of 3.5 parts of a 20% nitric acid per one part of monazite sand has been found suitable. However, the nitric acid concentration of the solution to be extracted preferably is not above 4 N because the higher acidities do not change the degree of extraction sufficiently to warrant the higher expense.

As has been mentioned above, the presence of ferric nitrate increases the selectivity of the extraction. This has also been found true with regard to sulfate anions which might have been carried along from the solution step of the monazite sand through the precipitation step in the preliminary treatment prior to extraction.

The concentration of the ferric nitrate may vary in wide ranges; however, the total quantity has to be sufficient to complex at least the major proportion of the phosphate anion; for one part by weight of $P_2O_5$ (present as phosphate) a quantity of ferric nitrate corresponding to one part of $Fe_2O_3$ is sufficient. Greater amounts are favorable because any excess acts as a salting-out agent, as has been mentioned above.

It is understood that, in addition to the ferric nitrate and nitric acid present in any case, other salting-out agents may be used; an especially satisfactory additional salting-out agent is calcium nitrate.

The solvents are preferably equilibrated with nitric acid prior to their use for extraction so that the acidity of the aqueous solution remains constant. All alkyl phosphates, which are substantially water-immiscible and stable, and in particular which do not decompose, at least substantially, with the acid and/or the metal salts present in the aqueous solution to be treated, are suitable for the process of this invention. Alkyl phosphates of the formula $R_2R'PO_4$, where R indicates either an alkyl radical or a hyrogen atom and R' an alkyl radical, have been used successfully. For instance, tributyl phosphate, trioctyl phosphate, dioctyl hydrogen phosphate, trihexyl phosphate, octadecyl dihydrogen phosphate, and mixtures thereof are suitable for the process of this invention. The alkyl phosphates may be used alone or be diluted by a less viscous organic substance. In the latter phase separation is facilitated.

Diluents for the alkyl phosphate solvents should have a specific gravity lower than that of water and preferably less than 0.8. The diluents should also preferably have a low viscosity, as mentioned above, and should be miscible with the alkyl phosphate but substantially immiscible with water. It is also desirable that the diluents have a low volatility and a high flash point, preferably a flash point higher than 35° C. so that fire hazards are reduced. Finally the diluent, just like the solvent, has to be stable in the strong acids used and, in particular, in concentrated nitric acid. A great number of hydrocarbons, ethers, esters and other oxygen-containing organic solvents were found to have the required properties; examples of suitable diluents are: dibutyl ether, isoamyl acetate, diisopropyl ether, pentaether (dibutyloxytetraethylene glycol) hexane, n-heptane, or mixtures thereof.

The proportions between solvent and diluent are not critical, and it will be readily understood that a higher solvent content brings about a higher extraction efficiency per se, while a higher content of diluent will facilitate phase separation and thereby improve the degree of the separation desired. It was found that the solvent advantageously contains a diluent, but not more than 80% thereof, a content of from 30 to 50% being preferred.

The organic extract phase containing the bulk of the thorium and uranium values originally present is preferably subjected to scrubbing in order to remove rare earth metal values that have also been extracted. As a scrubbing solution, a 20% nitric acid has been found suitable; however, other solutions of mineral acid may also be used.

The thorium and uranium contained in the organic extract phase may be selectively back-extracted. Contacting of the organic extract phase with, for instance, diluted nitric acid selectively back-extracts the thorium from the organic phase, and the thorium may then be recovered from the aqueous solution by any method known to those skilled in the art, for instance, by precipitation with oxalic acid. Uranium may then be back-extracted from the solvent phase with water.

By devising the process of this invention, it has been made possible to extract thorium and uranium in the presence of phosphate anions, which had been held impossible heretofore. The process is applicable to mixtures of thorium and rare earth and/or uranium values other than those outlined above. The various fractions obtained by the process of this invention may be subjected to a second cycle of extraction, and a still higher degree of separation may thus be accomplished. Instead of pretreating the monazite sand by the above described fractional precipitation, the thorium, rare earth and uranium values may, for instance, also be precipitated completely in one step, and the precipitate may then be dissolved; the solution obtained may then be treated by the process of this invention.

In the following example the effect of ferric nitrate on the thorium extraction is illustrated.

*Example*

Twenty-five ml. of an aqueous solution containing

| | |
|---|---|
| Total oxides | g./100 ml 2.787 |
| $ThO_2$ | g./100 ml 0.368 |
| $P_2O_5$ | g./100 ml 0.997 |
| $SO_4$ | g./100 ml 0.1 |
| $HNO_3$ | 3.0 N | were used for each test in which the concentrations of ferric nitrate varied. These 25 ml. were contacted for five minutes with 50 ml. of tributyl phosphate which had previously been equilibrated with nitric acid so as to leave, after equilibration, a concentration of 3 N $HNO_3$. The results of these tests are compiled in the following table.

| Ferric ion as Ferric nitrate | | Percent total oxides extracted | Percent thorium extracted |
|---|---|---|---|
| g./100 ml. | molarity | | |
| 2.378 | 0.0588 | 29.5 | 71.2 |
| 4.75 | 0.1176 | 37.2 | 86.5 |
| 7.13 | 0.1764 | 38.6 | 94.2 |
| 9.50 | 0.2352 | 41.7 | 98.7 |
| 11.89 | 0.2940 | 42.0 | 97.4 |
| 14.28 | 0.3528 | 44.6 | 98.5 |

The thorium-extraction values, when plotted in a diagram as a function of ferric nitrate concentrations, yield a curve which shows a drastic reduction of extraction as the ferric nitrate concentration approaches zero. This diagram is shown in the accompanying drawing.

It will be understood that this invention is not to be limited to the specific details given herein but that it may be modified within the scope of the appended claims.

What is claimed is:

1. A process for separating thorium values from rare earth values contained in phosphate precipitates obtained from monazite sand solutions, comprising dissolving the precipitate in a mixture of aqueous nitric acid and ferric nitrate, contacting the solution formed with a substantially water-immiscible alkyl phosphate whereby thorium values are preferentially taken up by an organic phase, while the rare earth values preferentially remain in the aqueous solution, and separating an organic extract phase from the remaining solution.

2. The process of claim 1 wherein the concentration of the nitric acid in the mixture is about 20%.

3. The process of claim 1 wherein the alkyl phosphate is tributyl phosphate.

4. The process of claim 1 wherein the alkyl phosphate is diluted with an organic compound of a lesser specific gravity than water.

5. The process of claim 4 wherein the alkyl phosphate is tributyl phosphate and the diluent is dibutyl ether and the respective proportions of the two compounds are 20 parts and 80 parts.

6. A process for separating thorium values from rare earth values contained in an aqueous phosphate anions-containing nitric acid solution obtained in the processing of monazite sand, comprising adding ferric nitrate to said solution, contacting said solution with a substantially water-immiscible alkyl phosphate whereby the thorium values are preferentially taken up by an organic extract phase, while the rare earth values preferentially remain in the aqueous solution, and separating an organic extract phase from the remaining aqueous solution.

References Cited in the file of this patent

UNITED STATES PATENTS

| | | |
|---|---|---|
| 1,368,243 | Davis | Feb. 15, 1921 |
| 2,683,655 | Peppard | July 13, 1954 |

FOREIGN PATENTS

| | | |
|---|---|---|
| 654,696 | Great Britain | June 27, 1951 |

OTHER REFERENCES

Britton: Hydrogen Ions, pp. 248–293, 330, 335 and 336 (1929). Pub. by D. Van Nostrand, New York, N. Y.

Warf: U. S. Atomic Energy Commission, declassified document No. AECD–2524, March 11, 1949 (declass. date), 10 pages.

Sivarajan: Journal of the Indian Institute of Science, vol. 34, pp. 1–3 (January 1952).